(12) United States Patent
Puttmann

(10) Patent No.: US 6,364,036 B1
(45) Date of Patent: Apr. 2, 2002

(54) AUTOMATIC ROD ASSEMBLY

(75) Inventor: Franz-Josef Puttmann, Lennestadt (DE)

(73) Assignee: Tracto-Technik-Paul Schmidt Spezialmaschinen (DE)

(*) Notice: Subject to any disclaimer, the term of this patent is extended or adjusted under 35 U.S.C. 154(b) by 0 days.

(21) Appl. No.: 09/510,094

(22) Filed: Feb. 22, 2000

(30) Foreign Application Priority Data

Feb. 23, 1999 (DE) .......................................... 199 67 607
May 19, 1999 (DE) .......................................... 199 22 813

(51) Int. Cl.⁷ .............................................. E21B 19/14
(52) U.S. Cl. ..................................... 175/52; 414/22.69
(58) Field of Search ...................... 175/22, 52; 405/184; 414/22.63, 22.68, 22.69

(56) References Cited

U.S. PATENT DOCUMENTS

| | | | |
|---|---|---|---|
| 3,762,578 A | * | 10/1973 | Cooper et al. |
| 3,773,188 A | * | 11/1973 | Arrington |
| RE29,020 E | * | 11/1976 | Moody et al. |
| 5,505,558 A | * | 4/1996 | Brown |
| 5,513,713 A | * | 5/1996 | Groves |
| 5,980,157 A | | 11/1999 | Puttman ................ 405/184 |
| 6,246,132 B1 | * | 6/2001 | Joshi et al. |

FOREIGN PATENT DOCUMENTS

| | | | |
|---|---|---|---|
| DE | 196 08 980 | 9/1997 | |
| EP | 0 812 976 A2 | 12/1997 | ............. E21B/7/06 |

\* cited by examiner

*Primary Examiner*—Roger Schoeppel
(74) *Attorney, Agent, or Firm*—Schwegman, Lundberg, Woessner & Kluth, P.A.

(57) ABSTRACT

The invention pertains to a method for introducing and removing rod sections into and from the push/pull axis of a push/pull unit, the individual rod sections being essentially arranged one after another and being joined to one another or detached from one another by being rotated in or out about an axis located essentially perpendicular to the axis of the rod section.

10 Claims, 12 Drawing Sheets

AUTOMATIC ROD ASSEMBLY

FIELD OF THE INVENTION

The invention pertains to a method for introducing and removing a rod assembly, such as is used for boring in the ground, in particular for producing or widening ground bores and/or for shattering old pipelines and laying new pipelines, using various tools.

BACKGROUND OF THE INVENTION

It is known to produce ground bores with the aid of presses or winches by means of a static forward drive, by a rod assembly with a boring head being pushed or pulled through the ground. In the same way, old pipelines can be shattered, for example with a bursting head fixed to the rod assembly, and replaced by new pipelines.

The boring or widening heads are generally driven into the ground with the aid of a push/pull unit which is located in an excavation on the axis of the bore and acts on the rod assembly. In the case of the widespread round rod assemblies, the force from the push/pull unit is transferred via clamping jaws acting on the outer surface of the rod assembly or via an adapter which is fitted to the end of the rear rod section.

SUMMARY OF THE INVENTION

With the rod assembly described in German patent 196 08 980, a rod assembly was provided which avoids the threaded joints, which are sensitive to soiling and time-consuming to join, of the known round rod assemblies, in that a ladder-like rod section is proposed which has projections and/or recesses for positive coupling means of a forward drive unit. In addition, the rod sections have coupling means at their ends, which likewise permit the positive joining of the individual rod sections. However, the rod sections have to be joined individually and by hand by an operator, who is located for example in the starting excavation.

The European laid-open specification 0 812 976 discloses a boring rod in which the individual rod sections are joined to one another in an articulated manner and are moved into the axis of the bore via an excavation. The individual rod sections execute a change in position during this from an essentially vertical to an essentially horizontal position. The disadvantage of this method and this apparatus is that the pins which join the rod sections to one another have to be hammered individually into the connecting holes provided for the purpose when the rod assembly is assembled, and have to be hammered out of the holes during the removal of the rod sections. Although this permits automatic feeding of a rod assembly from the surface of the ground, it requires a considerable expenditure in terms of time and force when joining the rod sections. Under the conditions of the building site, such pin connections also often become dirty and thus difficult to operate.

Starting from this point, the invention is based on the object of providing a method for automatically joining and/or detaching rod sections.

The invention is based on the idea of producing mutual engagement between rod sections, for example of the type described in German patent 196 08 980, by means of a specific geometric arrangement and rotation about an axis located essentially perpendicular to the axis of the rod sections, and of detaching rod sections from one another.

The invention is also based on the object of providing an apparatus for automatically detaching and joining rod sections.

The objects are achieved by the independent claims. Configurations are to be taken from the subclaims.

With the aid of the method of the invention, a rod connection can be made without the presence of an operator, for example in a narrow shaft. This is particularly advantageous in the case of sewage shafts, which normally have a diameter of only 1 meter. This small diameter does not permit the simultaneous presence of an operator when there is already a push/pull unit in the shaft. Using the apparatus of the invention and the method of the invention, the rod sections can be fed from the surface of the roadway, especially with the aid of a guide element, preferably a feed tube, to the axis of the bore and therefore to the boring rod assembly. At the same time, natural gravity preferably has the effect that the inserted rod sections slide further, the rotation according to the invention effecting automatic coupling of the ends of the rod sections.

With the aid of the method of the invention, it is likewise possible for detachment of the rods to be carried out without the presence of an operator. Instead of natural gravity, in this case the pressure exerted by the push/pull apparatus on the rod assembly acts on the latter as it is withdrawn from the bore. In this case, the rod sections, when they reach a specific position in the excavation, can be levered out of the axis of the bore, by a specific angle, using pressure, spring force or lever force. The angle is then selected such that as the rod is displaced further in relation to the levered-out rod section, for example on a guide element or pipe, the force exerted by the push/pull unit is converted into a rotation about a point perpendicular to the axis of the rod section. If a guide pipe is used, the rod sections can be pushed to the surface of the ground one after another in this way and can be removed there. As already described, the rods can be pushed one after another to the surface of the ground. However, it may also be the case that the rods are conveyed to the surface of the ground by a conveying mechanism by a guide pipe, a guide rail or the like. If the rod sections have extensions or recesses, the conveying mechanism can preferably act on these extensions or recesses and convey the rods. In a preferred design, the conveying mechanism is driven by the push/pull carriage, optionally via a link mechanism.

In a special embodiment, however, the drive could also have a separate drive, it then being necessary for the drives to be coordinated with each other, which would make the matter more complicated.

In the preferred embodiment, it is finally possible to say again that the drive for conveying the rods in and conveying the rods out is carried out via the carriage. (advance carriage) of the push/pull unit, that is to say ultimately via the drive of the latter. No separate drive would be needed for the rod transport.

The transmission of force is primarily carried out from the drive to the rod via flat link mechanisms, which can also be operated with spring assistance.

The guide element can be magnetic and/or can comprise a guide pipe made of individual pluggable pipe elements, and can be fixed to the push/pull unit. For reasons of weight, the guide element may also be of lattice design.

The push/pull unit is preferably operated via two cylinders. The two cylinder chambers of the push/pull unit can each be connected to a pressure source via a hydraulic line each with a ¾-way valve, between which there is connected a changeover valve with a manometer which measures the respective current pressure and which, when the maximum pressure is reached, switches the ¾-way valve via a controller and, in so doing, connects one or the other hydraulic line to the pressure source.

This permits automatic operation of the advance carriage, so that the entire apparatus is completely automated. In addition, damage can be avoided if the apparatus is set for a maximum thrust and/or pulling pressure, so that the apparatus is automatically switched off if it encounters an unexpected obstacle in the ground.

The rod feed and removal system of the invention has considerable safety advantages, since crush injuries of an operator in the shaft caused by a rod emerging from the bore in the shaft are ruled out.

Furthermore, the invention is also suitable for use with an automatic rod store, such as a rod magazine, which can be positioned on the surface of the ground and, accordingly, does not have to be matched in size to the shaft size, like conventional rod magazines. When an automatic rod magazine is used for accommodating and dispensing rods, the entire unit can be operated by a single person, who merely has to control the forward drive unit and can remain at any desired point, for example in the target shaft.

BRIEF DESCRIPTION OF THE DRAWINGS

The invention will be explained in more detail below using an exemplary embodiment illustrated in the drawing, in which.

DETAILED DESCRIPTION OF THE INVENTION

Figure 1:
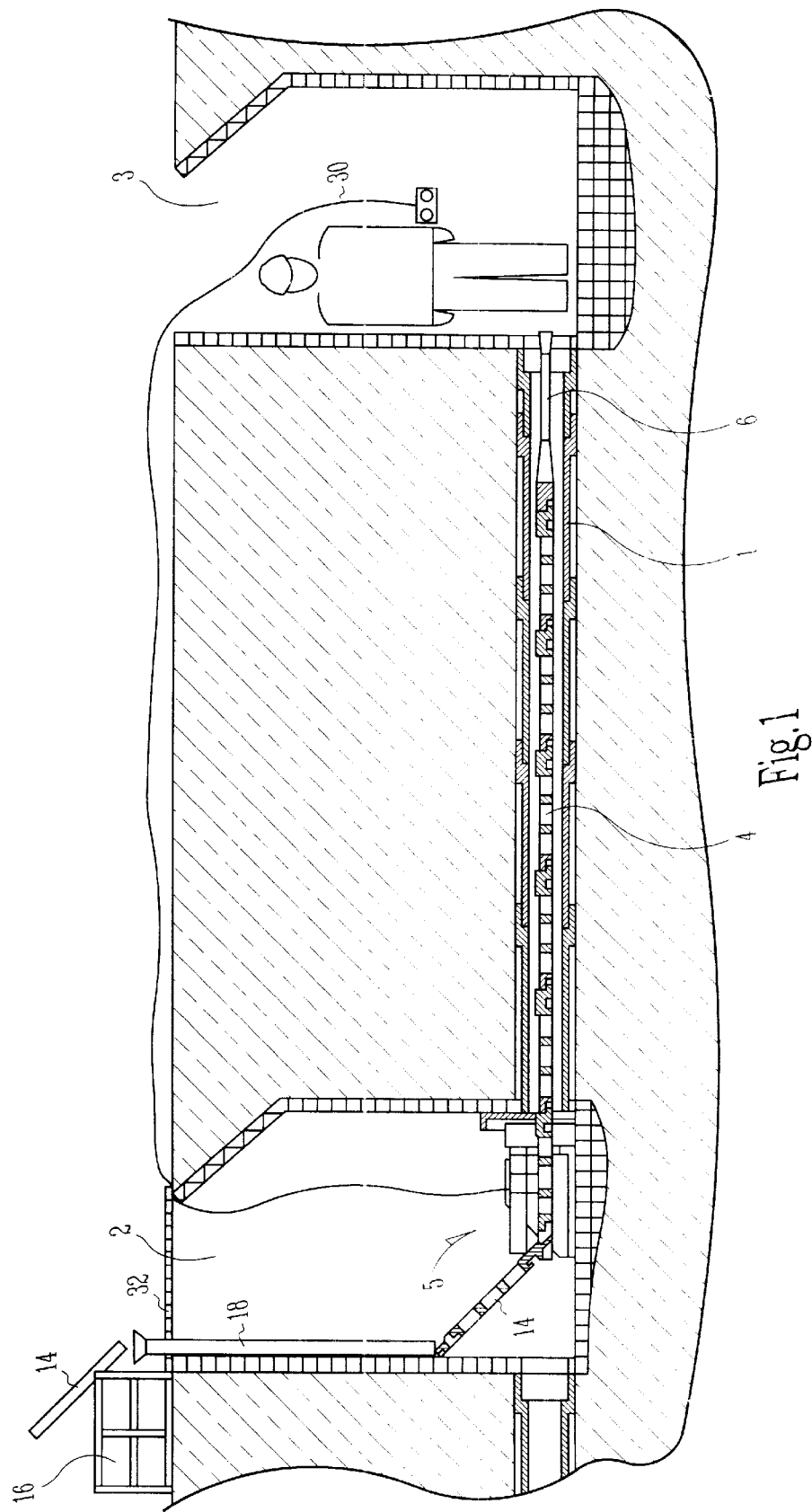
FIG. 1 shows a schematic illustration of the method of the invention with the connecting pipe of the invention during the introduction of a rod into an underground pipeline.

The view illustrated in FIG. 1 shows a horizontal pipe 1 which has been laid in the ground and is to be replaced, between a starting excavation 2 and a target excavation 3, with a rod assembly 4 located in the pipe 1 and comprising individual rod sections 14 with a push/pull unit 5. The aforementioned arrangement is described in German patent 196 08 980, the content of which is hereby incorporated in full.

Located at the front end of the rod assembly is a guide head 6, which guides the rod assembly 4 through the existing pipe 1 from the starting excavation 2 to the target excavation 3, in order then to be replaced by a bursting head 8, 10 or a widening head 12. The rod assembly 4 led through the old line 1 or driven through the ground (see FIG. 4) is then pulled back into the starting excavation with the aid of the push/pull unit 5 in order to burst the old line 1 with the bursting head 8, 10 (see FIGS. 2 and 3) or the widening head 12 (see FIG. 4).

As the rod assembly is being fed into the old line 1 or into the ground, the push/pull unit 5 has to be supplied continuously with new rod sections 14, which have to be joined to the rod assembly 4 in order to extend the latter into the old line 1.

Figure 2:
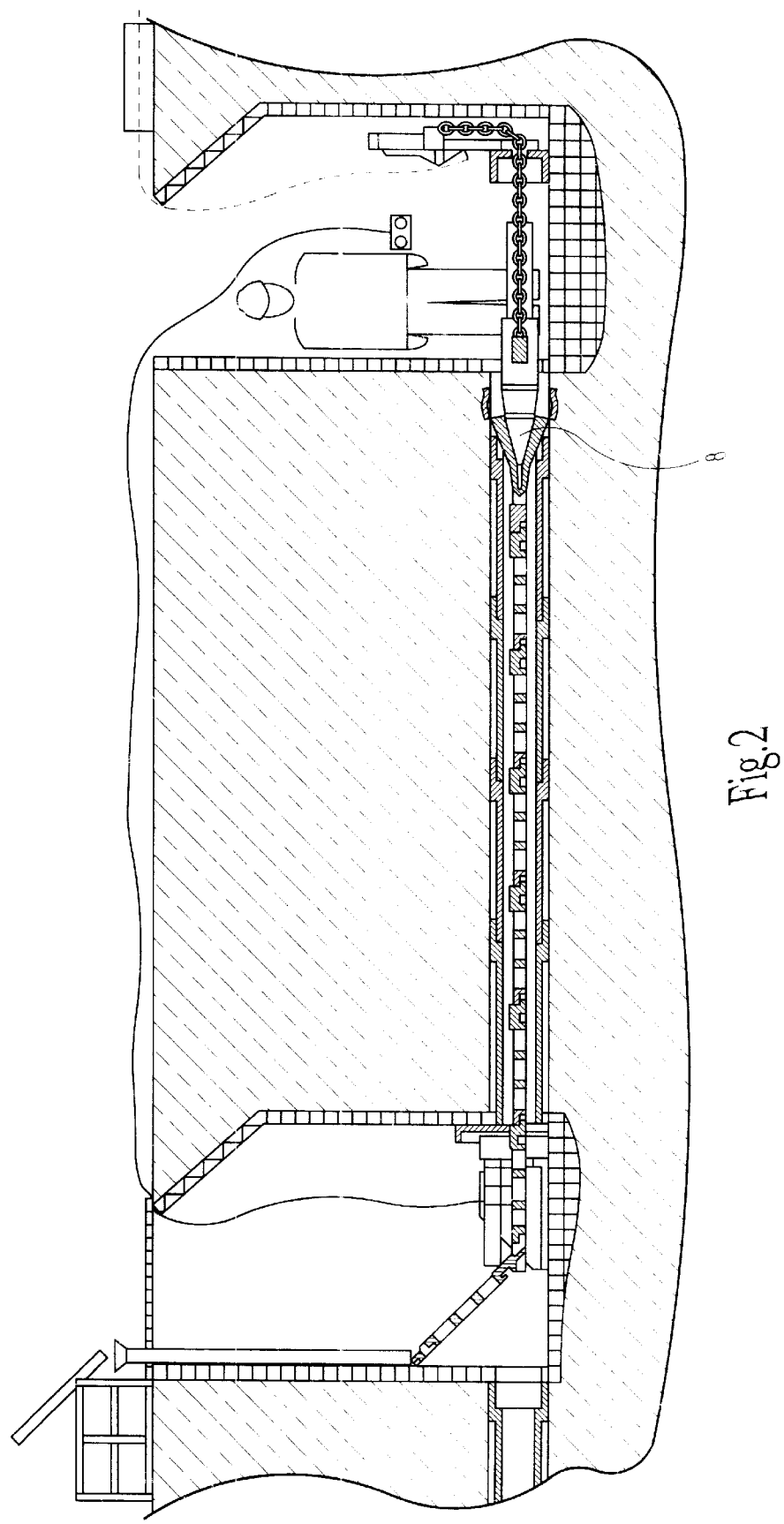
FIG. 2 shows the method and apparatus of FIG. 1 when a bursting head with sleeve pipe is being pulled in, with automatic removal of rod sections.
Figure 6:
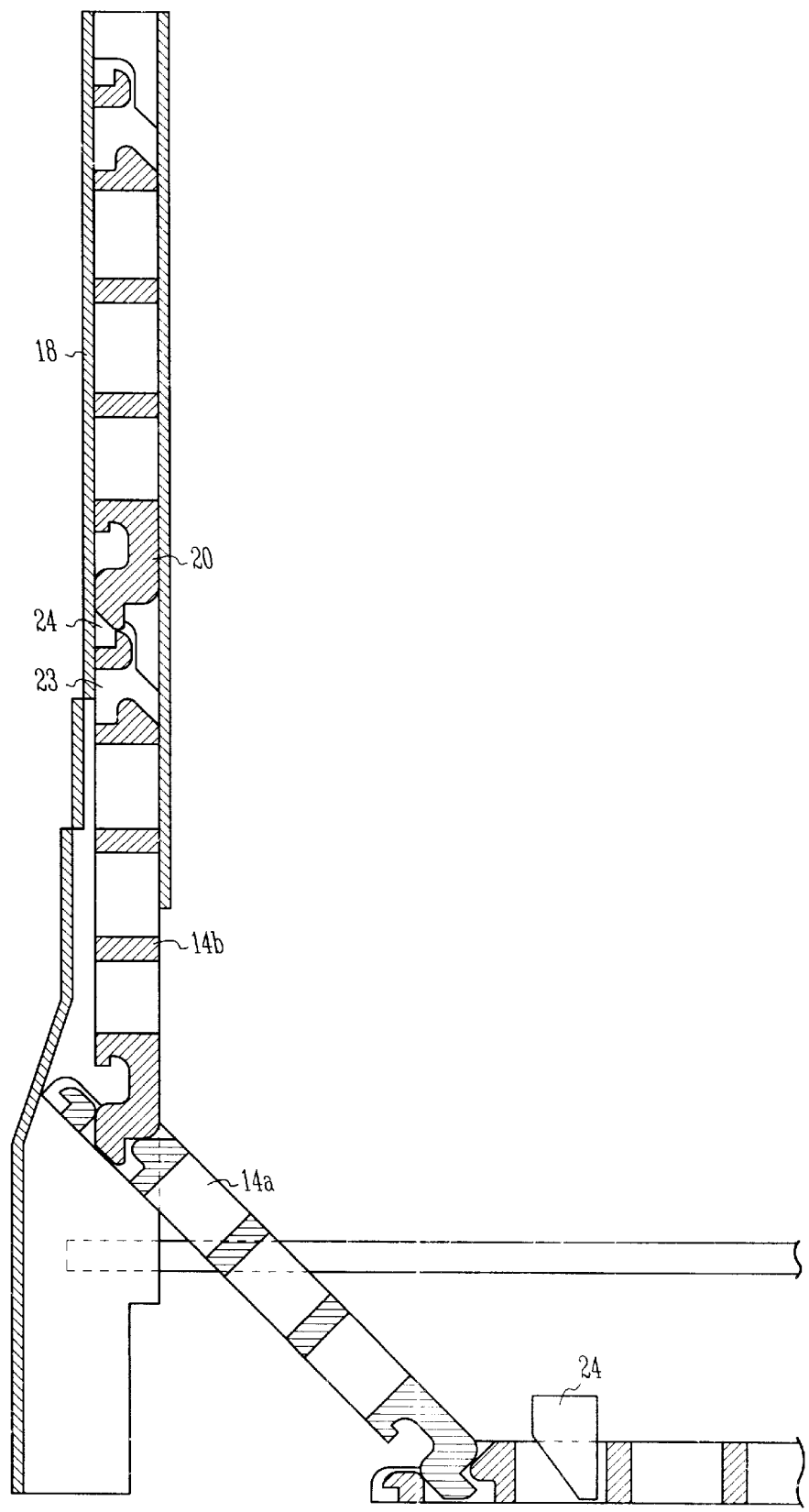
FIGS. 6 and 7 represent the method steps of the invention when rod sections are being joined.
Figure 7:
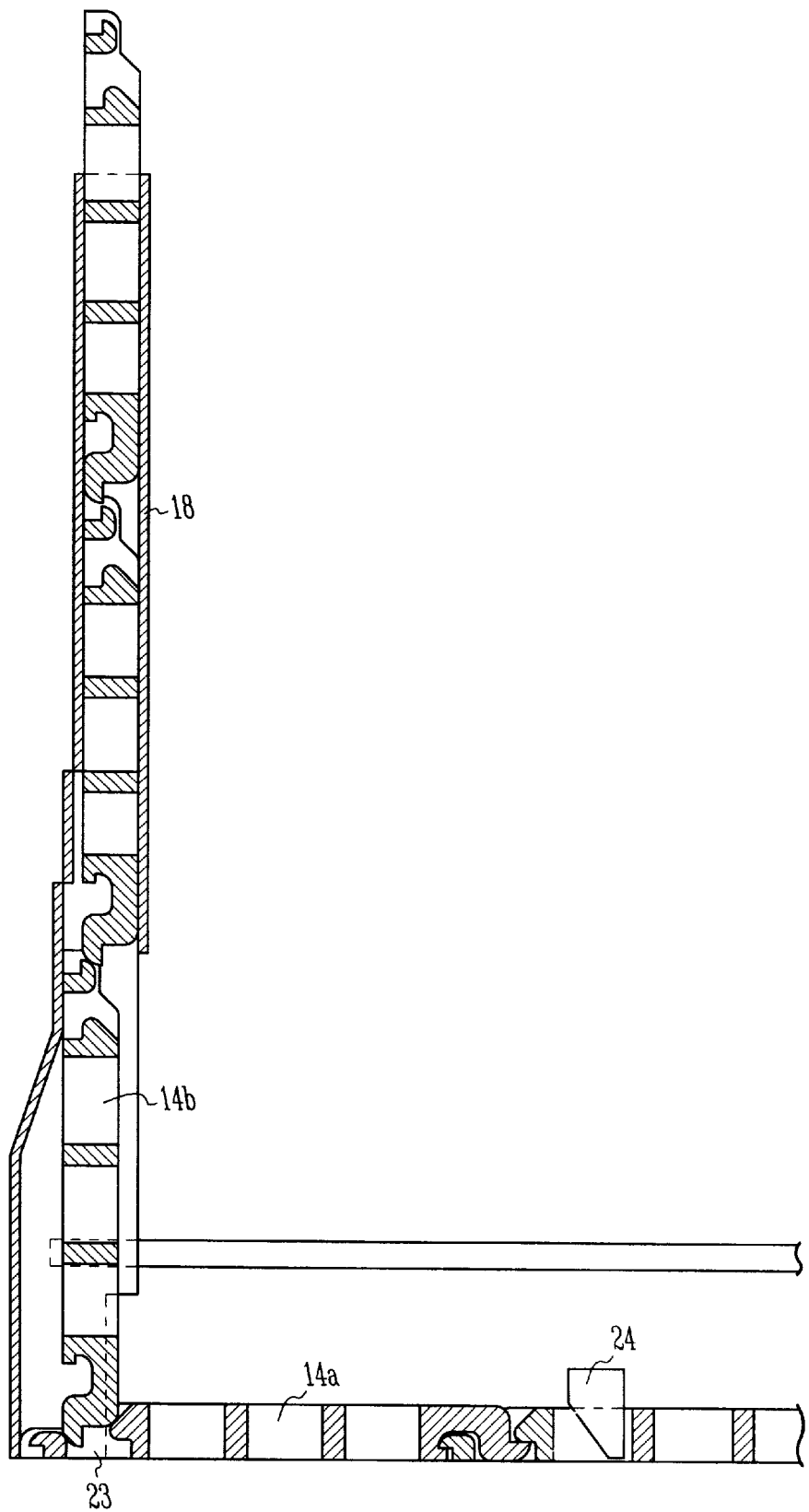

In the embodiment illustrated in FIGS. 1 and 2, the rod sections 14 are transferred from a rod magazine 16 into a guide pipe 18, in which, because of their weight, they are arranged one after another, without being joined, and move forward step by step in the guide pipe 18 as the rod assembly 4 is driven forward. The sequence of the method of the invention when the rod sections 14 are being joined, and the details of the guide pipe 18, are illustrated in FIGS. 6 and 7. In the upper region, the guide pipe is of funnel-like design.

As they proceed through the guide pipe 18, the rod sections 14 arranged one after another reach a widened region of this pipe, which permits a slight relative displacement of the rod sections arranged one behind another. At their ends, the rod sections have coupling elements 20, 21, which rest on one another in the guide pipe. When the widened region of the guide pipe 18 is reached, the male coupling piece 20 slides past parallel to the coupling piece 21, while the rod section which, in relation to the guide pipe 18, is located in the foremost position, is rotated into the axis of the bore about an axis which is perpendicular to the axis of the rod section (see FIG. 6). After the rotation has been completed, the rod section 14a lies in the axis of the bore, essentially perpendicular to the rod section 14b still located in the guide pipe, the male coupling piece 20 already being partly engaged with the female holder 23.

As the rod is driven forward into the bore or into the old pipe, the second pipe section 14b is then moved about an axis that is perpendicular to the axis of the rod section. During this process, the action of locking the coupling part 20 in the holder 23 takes place, and is completed when the rod section has reached its final position in the axis of the boring rod. The tracking of the rod sections 14 and their rotation into the axis of the bore takes place because of the action of gravity and at the speed of the advance of the rod assembly. In this case, the rod assembly is moved into the axis of the bore by means of pawls 24 on the push/pull unit 5.

The operator therefore does not have to move a heavy string but merely has to insert lightweight individual rods, if no automatic rod magazine is employed.

Figure 3:
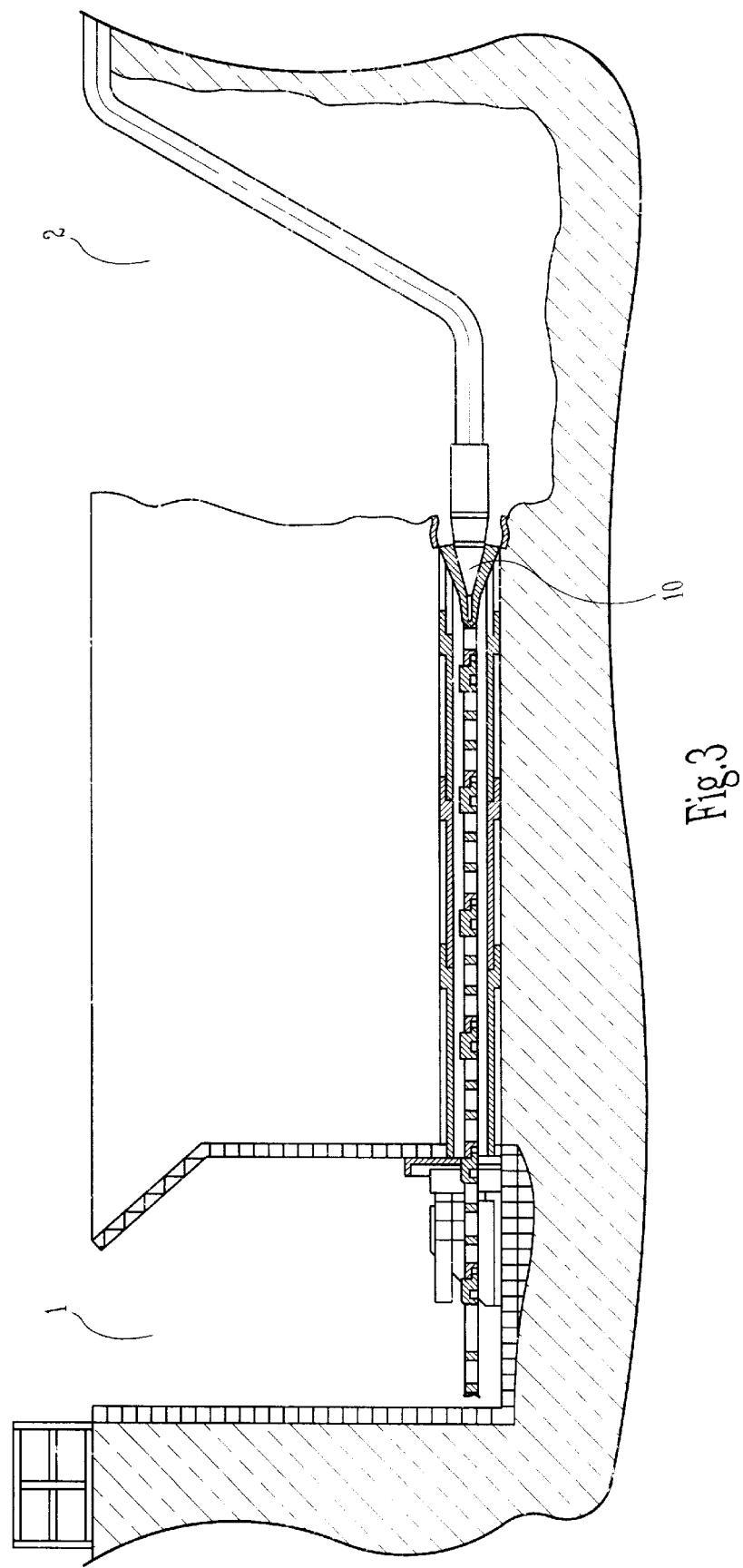
FIG. 3 shows the method of FIG. 2 when a bursting head is being drawn in with a replacement line.
Figure 4:
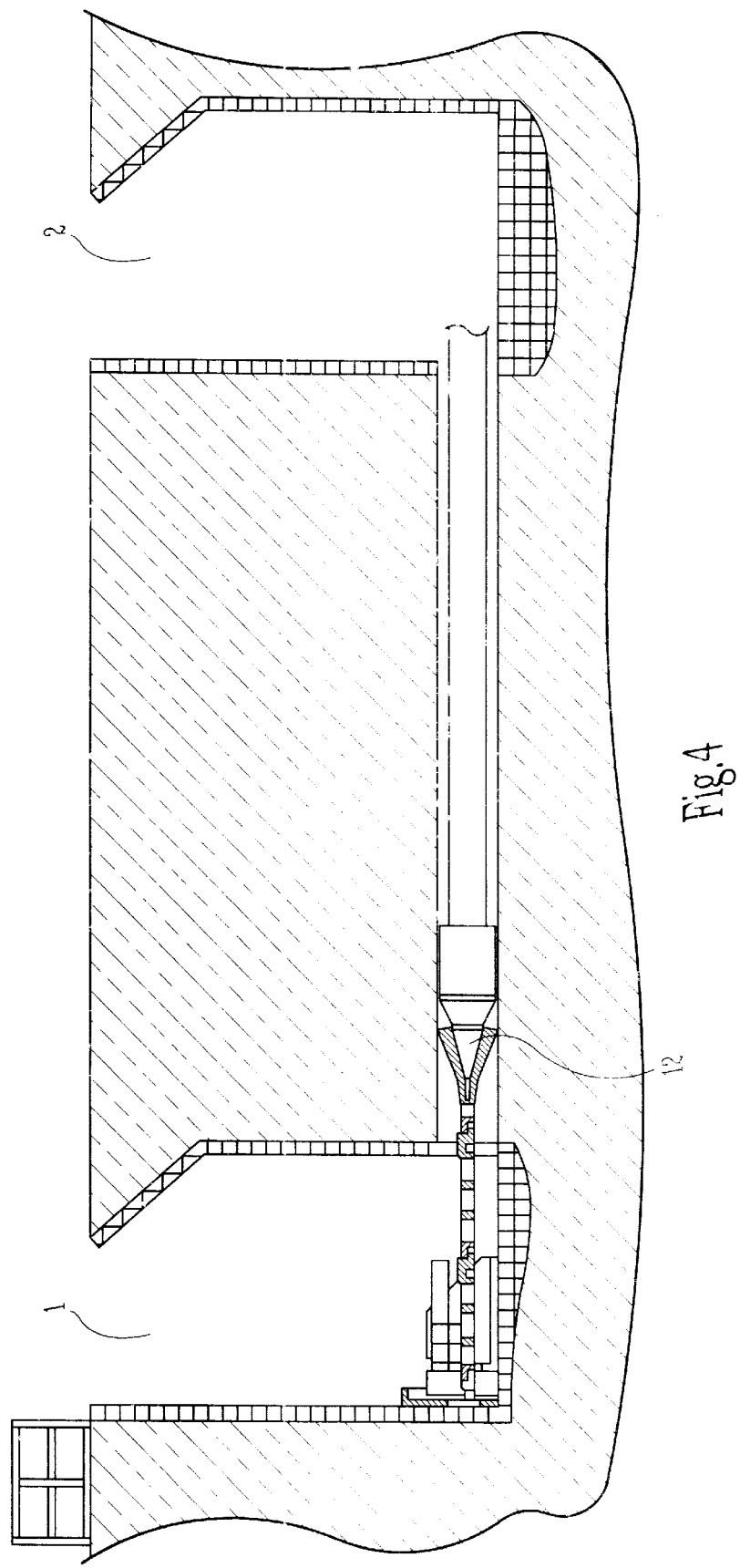
FIG. 4 shows the method of FIGS. 2 and 3 during the widening of a pilot bore.

Detaching the individual rod sections 14 from the rod assembly 4, as is necessary, for example in FIGS. 2, 3 and 4, to pull back the rod assembly out of the old pipe or out of the pilot bore, takes place in the opposite sequence, a thrust force, which occurs instead of the weight during the joining of the rod sections, being exerted on the rod sections 14 by the push/pull unit via the pawls 24.

Figure 8:
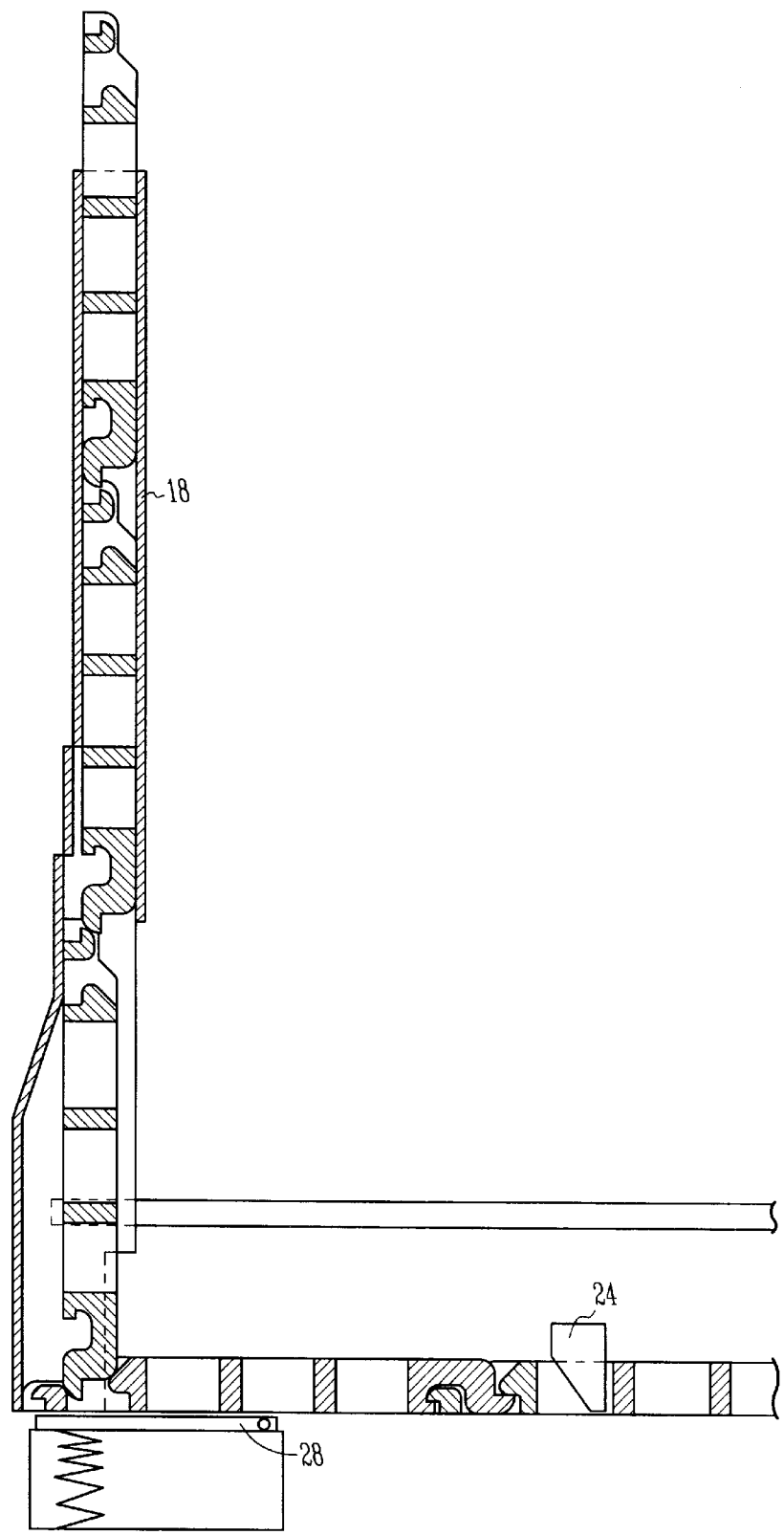
FIGS. 8 and 9 show the sequence of the method of the invention when the rod sections are detached before the vertical transport.
Figure 9:
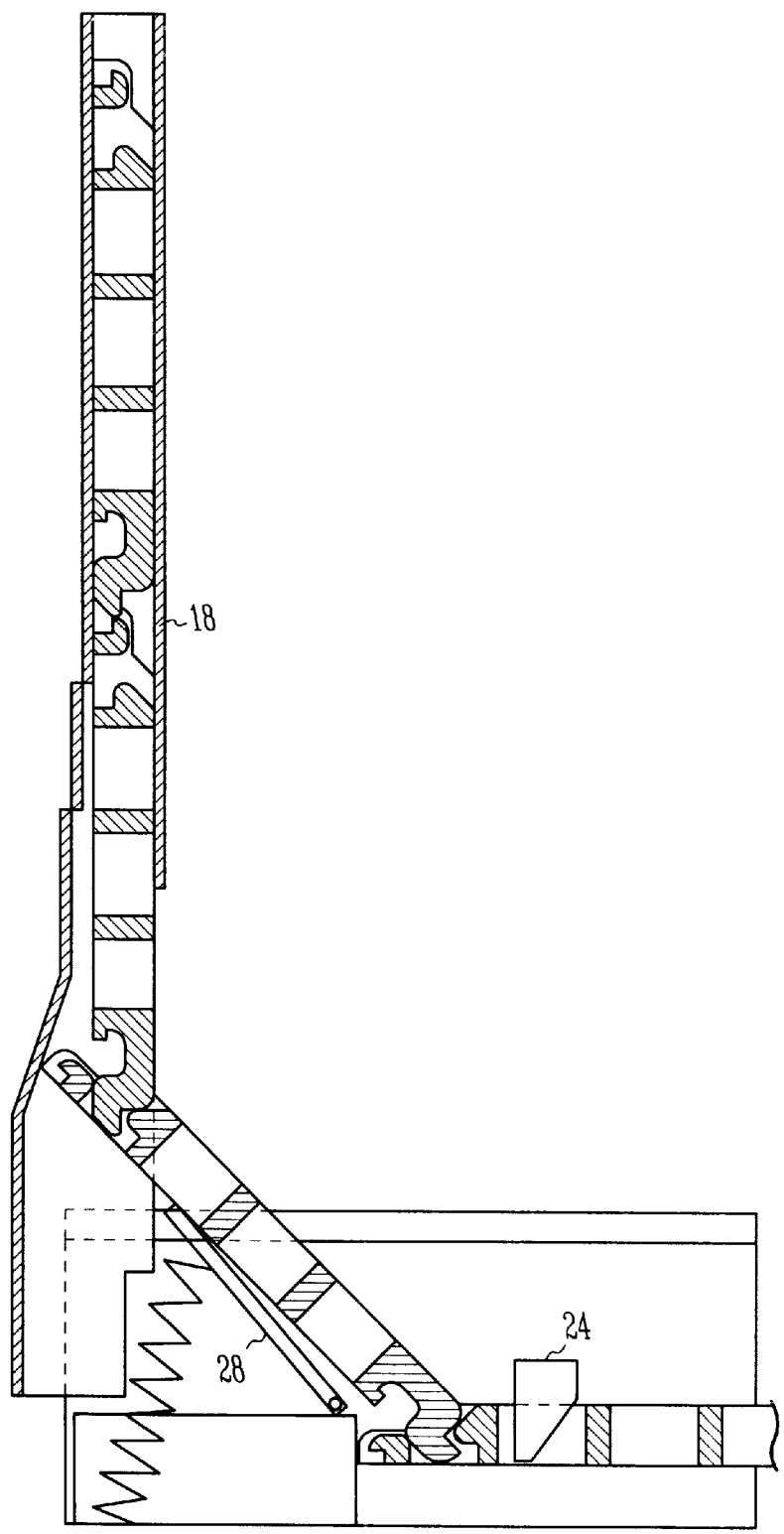
Figure 10:
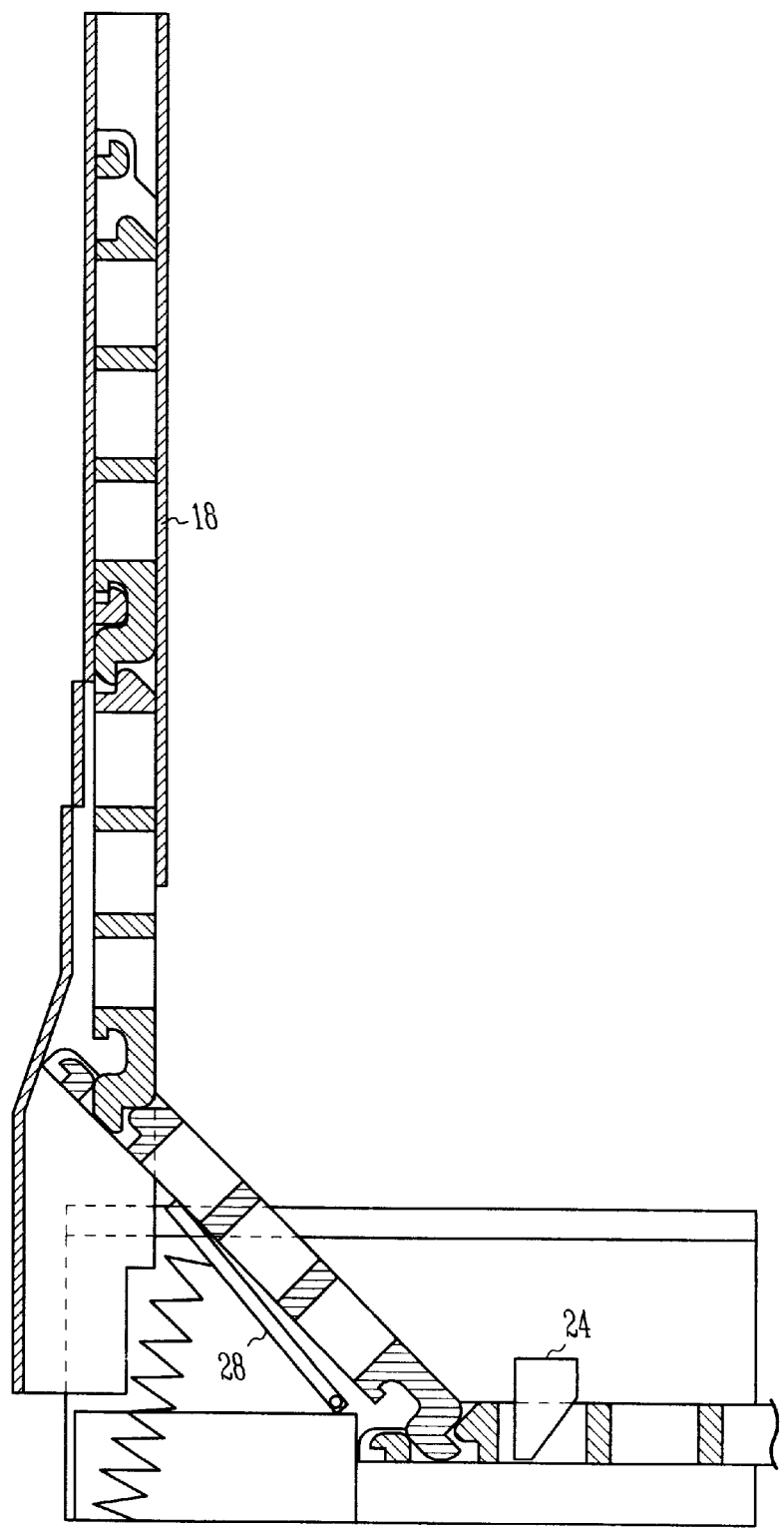
FIG. 10 shows the sequence of FIG. 9 with the rod sections being detached after the vertical transport.

As FIGS. 8 and 9 illustrate, the action of rotating the rod sections out can be initiated by a spring-controlled pressure plate 28. The pressure plate 28 rotates the rod section 14 out of the axis of the bore, as soon as the latter is no longer held down in the axis of the unit by the pawl 24 of the push/pull unit. In a similar way, the plate 28 is pressed down again as soon as the next rod section with the pawl 24 moves into the end position in front of the guide pipe 18. It is therefore not necessary for the rod sections to be transported to the surface of the ground by hand by the operator, instead they are pushed up by the push/pull unit. However, the pressure plate can also be used only for changing the direction, the rotating-out action then taking place at the surface of the ground and the rod sections being transported vertically while joined.

In order to remove the last rod sections from the guide element after the boring operation has been completed, said-guide element may be folded open.

Figure 5:
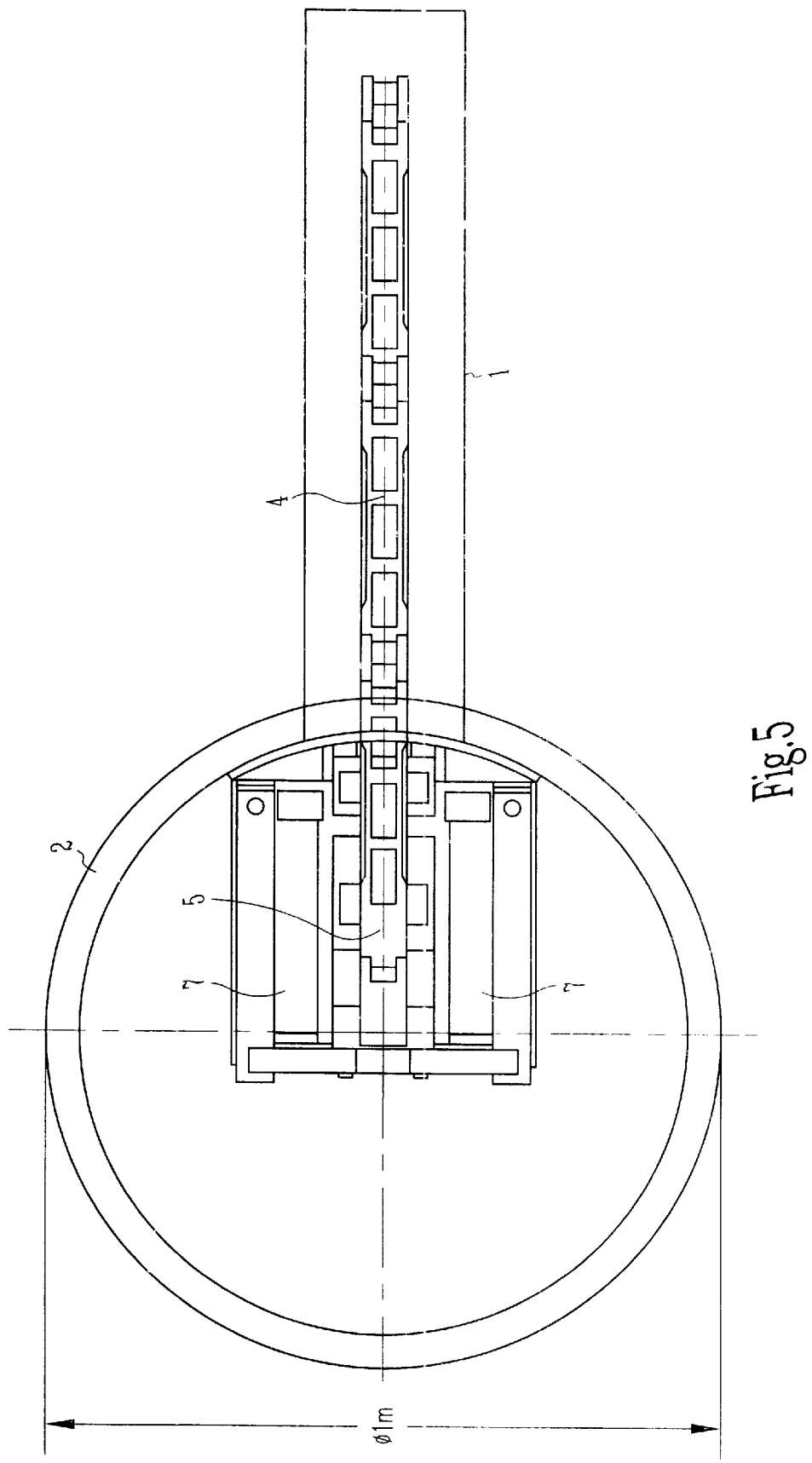
FIG. 5 shows a section through an apparatus of the invention in the area of the joining and/or detachment of the rods.

As can be seen in FIG. 1, the entire method can be carried out by a person located in the target excavation, for example, with an appropriate remote controller 30. The automatic rod magazine 16 ensures that the rod sections 14 are fed into the guide pipe 18, using which, according to the invention, said rod sections are automatically joined. It is no longer necessary for the person to stay in the narrow starting excavation (see FIG. 5), such as is provided, for example, in the case of a domestic connection.

The push/pull unit 5 is connected to a linear motor in the form of a preferably double-acting cylinder 7 having a piston 48 whose cylinder chambers 49, 50 are connected to a pressure-medium source 54 via two hydraulic lines 51, 52 with a ¾-way valve 53. From the hydraulic line 52, a branch line 55 leads via a changeover valve 56 to the hydraulic line 51. The changeover valve 56 is connected, via a line 57 with a manometer 58, to a controller 59, from which two control lines 60, 61 lead to the ¾-way valve 53.

Figure 11:
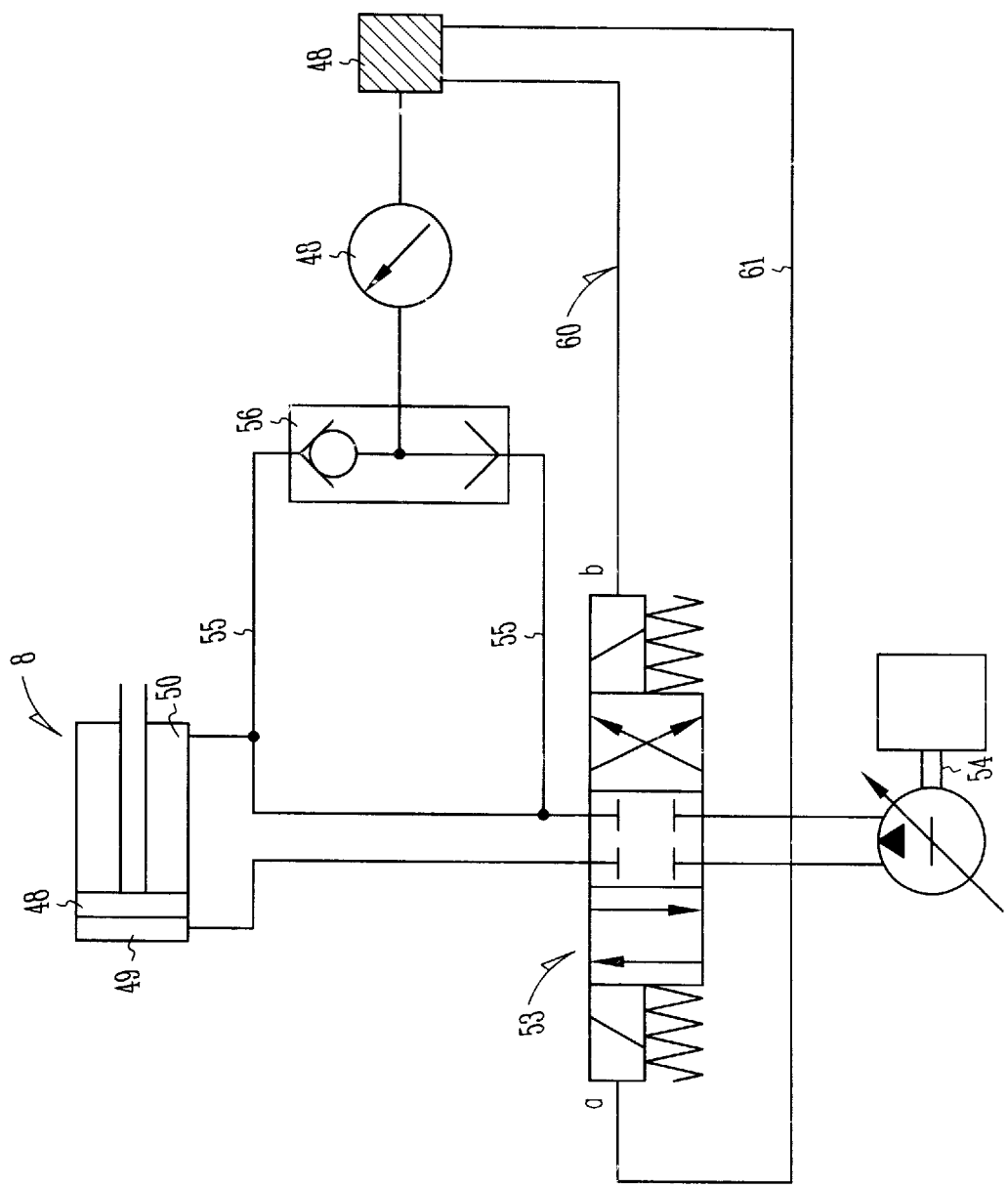
FIG. 11 shows a circuit diagram relating to the automatic control of the linear drive for the push/pull unit.

The automatic control system illustrated in FIG. 11 for the forward thrust carriage operates in such a way that the pressure rise which takes place in the two cylinder chambers 49, 50 shortly before the top dead center position of the piston 48 is converted, with the aid of the manometer 58, into a signal for the controller 59, which then changes over the ¾-way valve, via the lines 60, 61, in such a way that the cylinder chamber in which the pressure rise takes place is supplied with pressurized oil, and the piston 48 places its path in the opposite direction.

The excavation can be secured by a cover plate or a grating 32, which only has an opening for the guide pipe.

Figure 12:
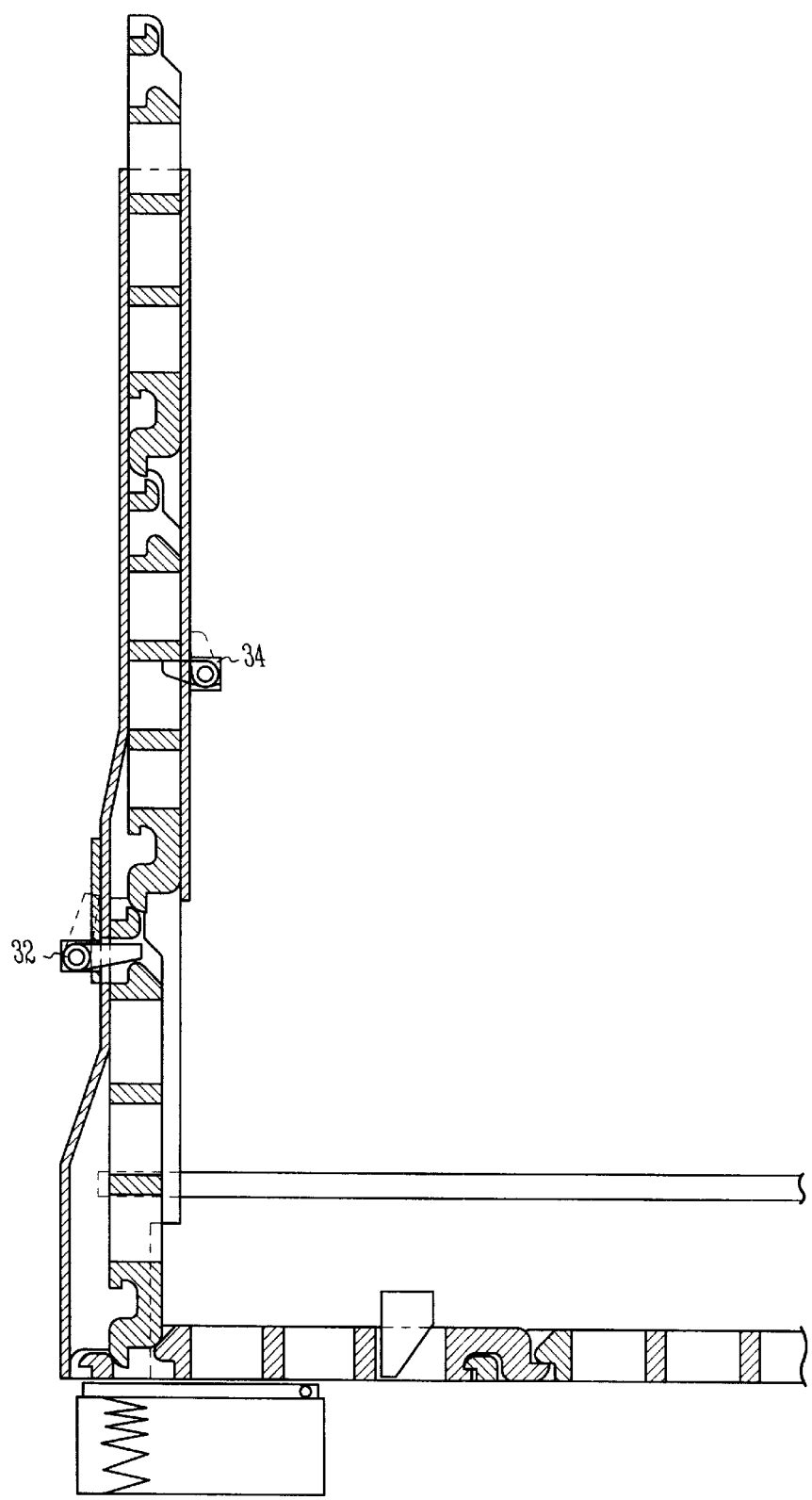
FIG. 12 shows a driven conveyor for the rod sections.

As illustrated in FIG. 12, the rod sections can also be moved by means of a conveyor 32 and therefore transported to the surface of the ground, for example via the guide element 18. The conveyor 32 preferably engages in extensions or recesses in the rod sections and, in this preferred embodiment, is driven by means of flat link mechanisms, which can also be spring-assisted, by the push/pull unit. The conveyor can have a locking means 34, which prevents the rod sections: 14 slipping back in the direction of the force of gravity.

What is claimed is:

1. A method for introducing and removing rod sections into and from the push/pull axis of a push/pull unit, wherein the individual rod sections are essentially arranged one after another and are joined to one another or detached from one another by being rotated in or out about an axis located essentially perpendicular to the axis of the rod section.

2. The method as claimed in claim 1, wherein the rod sections are rotated in by the force of gravity.

3. The method as claimed in claim 1, wherein the rod sections slide down from the surface of the ground.

4. The method as claimed in claim 1, wherein the rod sections are rotated in by thrust force.

5. The method as claimed in claim 1, wherein the rod sections are rotated out by lever or thrust force and/or in a translatory manner with the aid of the carriage of the push/pull unit.

6. The method as claimed in claim 5, wherein the rod sections are pushed up to the surface of the ground.

7. The method as claimed in claim 1, defined by a relative displacement of the rod sections to be joined, before or while they are being rotated in.

8. The method as claimed in claim 1, defined by a relative displacement of the rod sections to be joined, before or while they are being rotated out.

9. The method as claimed in claim 1, wherein, before being rotated in or before or after being rotated out, the rod sections are arranged and displaced essentially vertically with respect to the axis of the bore.

10. The method as claimed in claim 1, wherein a guide element is employed simultaneously for feeding and withdrawing the rod sections.

* * * * *